US012449525B2

United States Patent
Wootton et al.

(10) Patent No.: US 12,449,525 B2
(45) Date of Patent: Oct. 21, 2025

(54) SYSTEMS AND METHODS FOR DISTINGUISHING PERSONS FROM OTHER ENTITIES USING NETWORK PRESENCE SENSING

(71) Applicant: Ivani, LLC, Chesterfield, MO (US)

(72) Inventors: Matthew Wootton, O'Fallon, MO (US); John Wootton, St. Louis, MO (US); Chris Nissman, Tucson, AZ (US); Justin McKinney, Wildwood, MO (US); Saarth Mehrotra, Appleton, WI (US); Boris Dieseldorff, St. Charles, MO (US)

(73) Assignee: Ivani, LLC, Chesterfield, MO (US)

( * ) Notice: Subject to any disclaimer, the term of this patent is extended or adjusted under 35 U.S.C. 154(b) by 333 days.

(21) Appl. No.: 17/894,634

(22) Filed: Aug. 24, 2022

(65) Prior Publication Data

US 2023/0064871 A1    Mar. 2, 2023

Related U.S. Application Data

(60) Provisional application No. 63/236,503, filed on Aug. 24, 2021.

(51) Int. Cl.
*H04W 4/021* (2018.01)
*G01S 7/00* (2006.01)
*G01S 13/00* (2006.01)
*G01S 13/04* (2006.01)

(52) U.S. Cl.
CPC ............ *G01S 13/003* (2013.01); *G01S 7/006* (2013.01); *G01S 13/04* (2013.01); *H04W 4/021* (2013.01)

(58) Field of Classification Search
CPC ........ G01S 13/003; G01S 7/006; G01S 13/04; H04W 4/021
See application file for complete search history.

(56) References Cited

U.S. PATENT DOCUMENTS

| 9,474,042 | B1 * | 10/2016 | Wootton ............. G11C 11/2293 |
| 9,838,993 | B2 | 12/2017 | Pandharipande et al. |
| 10,325,641 | B2 * | 6/2019 | Wootton ............. G11C 11/2297 |
| 2013/0285855 | A1 * | 10/2013 | Dupray ................. H04W 4/021 342/451 |
| 2014/0087753 | A1 * | 3/2014 | Oka ....................... H04W 4/023 455/456.1 |
| 2016/0371959 | A1 | 12/2016 | Henderson et al. |
| 2017/0131125 | A1 | 5/2017 | Wilson et al. |
| 2017/0366938 | A1 * | 12/2017 | Wootton ............... H04B 17/27 |

(Continued)

OTHER PUBLICATIONS

Gu, Yu, et al., "WiFi-Assisted Human Activity Recognition", 2014 IEEE Asia Pacific Conference on Wireless and Mobile, Bali, Indonesia, 2014, pp. 60-65.

(Continued)

*Primary Examiner* — Muhammad Adnan
(74) *Attorney, Agent, or Firm* — Lewis Rice LLC

(57) ABSTRACT

Systems and methods for detecting the presence of a body (typically a human) in a network without fiducial elements while additionally using fiducial elements to assist the system and possibly reduce the computational loading on the system. The fiducial element may be used in many ways including, without limitation, assisting in ignoring some bodies present in the detection area and training the system using additional data.

20 Claims, 2 Drawing Sheets

(56) References Cited

U.S. PATENT DOCUMENTS

| | | | |
|---|---|---|---|
| 2018/0014160 A1 | 1/2018 | Wootton et al. | |
| 2019/0051342 A1* | 2/2019 | Wootton | G11C 11/2255 |
| 2019/0128675 A1* | 5/2019 | Kar | G01C 21/3438 |
| 2019/0304529 A1* | 10/2019 | Wootton | G11C 11/2259 |
| 2021/0173044 A1* | 6/2021 | Tartaro | G01S 13/536 |
| 2021/0185485 A1 | 6/2021 | Deixler et al. | |
| 2023/0064871 A1* | 3/2023 | Wootton | G01S 7/006 |
| 2024/0361469 A1* | 10/2024 | Dupray | H04W 4/021 |

OTHER PUBLICATIONS

Mrazovac, Bojan, et al., "Reaching the Next Level of INdoor Human PResence Detection: An RF Based Solution", 2013 11th International Conference on Telecommunications in Modern Satellite, Cable and Broadcasting Services (TELSIKS), Nis, Serbia, 2013, pp. 297-300.

Saeed, Ahmed, et al., "Ichnaea: A Low-Overhead Robust WLAN Device-Free Passive Localization System", Journal of Selected Topics in Signal Processing, Jan. 2013, pp. 1-11, vol. 99, No. 1.

International Search Report for PCT application No. PCT/US2022/041385 mailed Dec. 5, 2022, 11 Pages.

Wilson, Joey, et al. "Radio Tomographic Imaging with Wireless Networks" IEEE Transactions on Mobile Computing, May 2010, pp. 621-632.

Kosba, Ahmed E. et al., "Robust WLAN Device-free Passive Motion Detection", 2012 IEE Wireless Communications and Networking Conference, 6 Pages.

Kosba, Ahmed, et al. "RASID: A Robust WLAN Defice-free Passive Motion Detection System", 2012 IEEE International Conference on Pervasive Computing and Communications, pp. 180-189.

* cited by examiner

SYSTEMS AND METHODS FOR DISTINGUISHING PERSONS FROM OTHER ENTITIES USING NETWORK PRESENCE SENSING

CROSS-REFERENCE TO RELATED APPLICATIONS

This application claims the benefit of U.S. Provisional Pat. App. No. 63/236,503, filed Aug. 24, 2021, the entire disclosure of is herein incorporated by reference.

BACKGROUND

1. Field of the Invention

This disclosure is related to the field of object detection, and more particularly to systems and methods for detecting the presence of a biological mass within a wireless communications network, and distinguishing that biological mass from other types of biological masses using a fiducial element.

2. Description of the Related Art

Tracking objects may be done using a number of techniques. Methods include, for example, attaching a moving transceiver to the object. Examples of such systems include global positioning location systems such as GPS, which use orbiting satellites to communicate with terrestrial transceivers. However, such systems are generally less effective indoors, where satellite signals may be blocked, reducing accuracy. Thus, other technologies are often used indoors, such as Bluetooth™ beacons, which calculate the location of a roaming or unknown transceiver. The roaming transceiver acts as a fiducial element and is used as a proxy for the location of a human or other object to which the fiducial element is expected to be attached.

Such fiducial elements may not be useful in every tracking case, however. For example, the use of fiducial elements typically requires an upfront costs in procuring the necessary equipment. Further, the use of fiducial elements may require increased overhead as their use often must be planned or otherwise managed. For example, fiducial elements must be given to or otherwise attached to persons or objects being tracked before those persons or objects may be tracked by a fiducial element based tracking system. Moreover, tracking may not either not be possible or actively incorrect if a person or thing does not carry the fiducial element, or carries a fiducial element which is expected to be carried by a different person or thing whether intentional or unintentional.

Other solutions for tracking objects, such as persons, through a space are known which do not utilize a fiducial element in the tracking. For example, there exist detection methods and systems that may detect that there is a presence in a defined space (e.g., a room of a building) that is determined to be a human (or a particular human) by generally sensing disturbances to radio waves as they pass from node to node of a mesh network. These detection systems are referred to as Network Presence Sensing (or "NPS") systems herein. The primary NPS systems and methods for doing such tracking herein are described in U.S. Pat. Nos. 10,064,013 and 9,693,195, the entire disclosures of which are herein incorporated by reference.

Whole highly effective, many current NPS systems require considerable computing power or time to perform the many simultaneous tasks that a user may require of the system. The amount of data required, along with the number of related calculations, may overwhelm system resources. In a system with limited resources, this may limit the applications of NPS technology to only those which are tolerant of the time required to make the necessary calculations or where computing power is readily available. Similarly, this may limit the number of simultaneous applications that may use the NPS system because each application typically has a requirement for at least a minimum amount of computing resource. Further, the process of training an NPS system may be time consuming and laborious. And without proper training, an NPS system may lack sufficient accuracy to perform in some applications. Thus, there is a need for simplifying at least some aspects of NPS systems to lessen the burden on computing resources.

Accordingly, there may be a need in the art for a system that may take advantage of different tracking techniques, thereby allowing the utilized tracking techniques to augment each other.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, are systems and methods for detecting the presence of a body (typically a human) in a network without fiducial elements while additionally using fiducial elements to assist the system and possibly reduce the computational loading on the system. The fiducial element may be used in many ways including, without limitation, assisting in ignoring some bodies and training the system using additional data. Generally speaking, the systems and methods described herein use signal absorption, as well as signal forward scatter and reflected backscatter of the RF communication, caused by the presence of a biological mass in a communications network, generally a mesh network.

Described herein, in an embodiment, is a method for detecting the location of an object within a detection area, the method comprising: providing a first transceiver disposed at a first location within a detection area; providing a second transceiver disposed at a second location within the detection area; a computer server communicably coupled to the first transceiver; the first transceiver receiving a first set of wireless signals from the second transceiver when a first object carrying a fiducial element is present within the detection area at a first position; the computer server receiving a first set of signal data from the first transceiver, the first set of signal data comprising data about properties of the first set of wireless signals; the computer server receiving from the fiducial element, an indicator of the first position; the computer server creating a first baseline signal profile for wireless communications from the second transceiver to the first transceiver, the first baseline signal profile being based at least in part on the properties of the first set of wireless signals in the first set of signal data when the first object is present in the detection area at the first position; the computer server associating the first baseline signal profile with the first position; the first transceiver receiving a new set of wireless signals from the second transceiver when a new object without a fiducial element is present in the detection area at an unknown position; the computer server receiving a new set of signal data from the first transceiver, the new set of signal data comprising data about properties of the new set of wireless signals; the computer server comparing the new set of signal data to the first baseline signal profile; and the computer server indicating the new object is at the first location based on a comparison of the new set of signal data to the first baseline signal profile.

In an embodiment, the method further comprises the first object moving from the first position to a second position in the detection area; the first transceiver receiving a second set of wireless signals from the second transceiver when the first object is present at the second position; the computer server receiving a second set of signal data from the first transceiver, the second set of signal data comprising data about properties of the second set of wireless signals; the computer server receiving from the fiducial element, an indicator of the second position; the computer server creating a second baseline signal profile for wireless communications from the second transceiver to the first transceiver, the first baseline signal profile being based at least in part on the properties of the first set of wireless signals in the first set of signal data when the first object is present in the detection area at the second position; the computer server associating the second baseline signal profile with the second position; the computer server comparing the new set of signal data to the second baseline signal profile; and the computer server indicating the new object is at the second location based on a comparison of the new set of signal data to the second baseline signal profile.

In an embodiment of the method, the first object is a human being.

In an embodiment of the method, the new object is a human being.

In an embodiment of the method, the first object and the new object are the same human being.

In an embodiment of the method, the properties of the first set of wireless signals comprise wireless network signal protocol properties determined by the first transceiver.

In an embodiment of the method, each of the wireless network signal protocol properties is selected from the group consisting of: received signal strength, latency, and bit error rate.

In an embodiment of the method, the computer server operates an external system when the computer server indicates the object is at the first location.

In an embodiment of the method, the external system comprises an electrical system, a lighting system, a heating, venting, and cooling (HVAC) system, a security system, or an industrial automation system.

In an embodiment of the method, the first set of wireless signals utilizes a protocol selected from the group consisting of: Bluetooth™, Bluetooth™ Low Energy, ANT, ANT+, WiFi, Zigbee, Thread, and Z-Wave.

In an embodiment of the method, the first set of wireless signals have a carrier frequency in the range of 850 MHz and 17.5 GHz inclusive.

In an embodiment of the method, the first transceiver and the second transceiver are configured to calculate their relative positions within the detection area automatically.

In an embodiment of the method, the first transceiver and the second transceiver are configured to define automatically a detection area including the first transceiver and the second transceiver.

There is also described herein, in an embodiment, a method for determining the presence of a target object within a detection area, the method comprising: providing a first transceiver disposed at a first location within a detection area; providing a second transceiver disposed at a second location within the detection area; a computer server communicably coupled to the first transceiver; the first transceiver receiving a first set of wireless signals from the second transceiver when a calibration object is present within the detection area; the computer server receiving a first set of signal data from the first transceiver, the first set of signal data comprising data about properties of the first set of wireless signals; the computer server creating a first baseline signal profile for wireless communications from the second transceiver to the first transceiver, the first baseline signal profile being based at least in part on the properties of the first set of wireless signals in the first set of signal data when the calibration object is present in the detection area; the first transceiver receiving a first new set of wireless signals from the second transceiver when a new object with a fiducial element is present in the detection area; the computer server receiving a first new set of signal data from the first transceiver, the first new set of signal data comprising data about properties of the first new set of wireless signals; the first transceiver receiving a second new set of wireless signals from the second transceiver when the object without a fiducial element is present in the detection area; the computer server receiving a second new set of signal data from the first transceiver, the second new set of signal data comprising data about properties of the second new set of wireless signals; the computer server rejecting the new object as the target object due to the computer server detecting the fiducial element, the rejection occurring regardless of comparison of the first new set of signal data to the baseline signal profile; and the computer server determining the target object is within the detection area by comparing the second new set of signal data to the baseline signal profile.

In an embodiment of the method, the target object comprises a human and the new object comprises a non-human biological mass.

DESCRIPTION OF THE PREFERRED EMBODIMENT(S)

Figure 1:
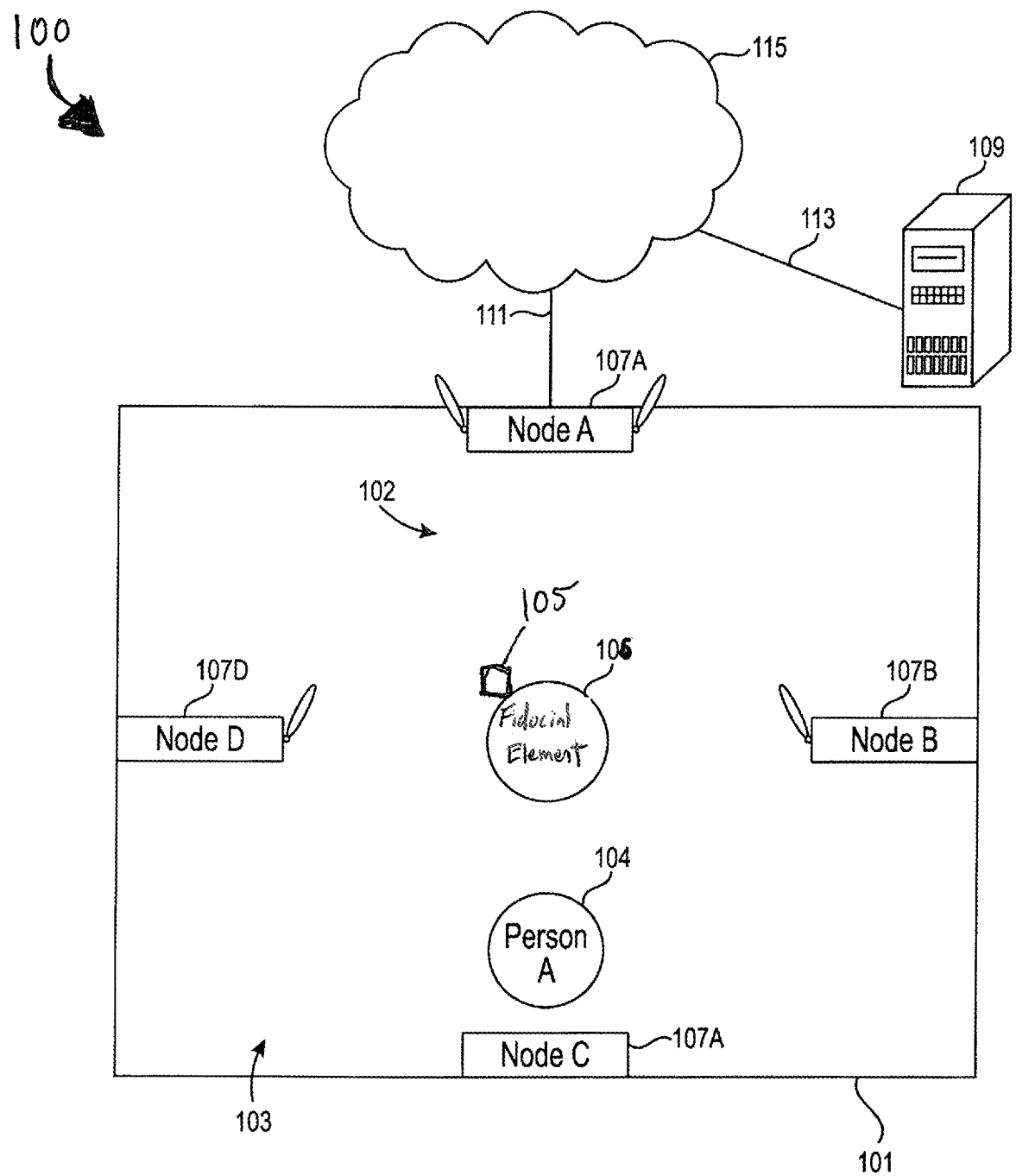
FIG. 1 depicts a schematic diagram of an embodiment of a system according to the present disclosure.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Throughout this disclosure, the term "computer" describes hardware that generally implements functionality provided by digital computing technology, particularly computing functionality associated with microprocessors. The term "computer" is not intended to be limited to any specific type of computing device, but it is intended to be inclusive of all computational devices including, but not limited to:

processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wrist-wear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth™ and other wireless communication devices, virtual memory, storage devices and associated controllers, firmware, and device drivers. The systems and methods described herein are contemplated to use computers and computer software typically stored in a computer- or machine-readable storage medium or memory.

Throughout this disclosure, terms used herein to describe or reference media-holding software, including without limitation terms such as "media," "storage media," and "memory," may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "real time" refers to software operating within operational deadlines for a given event to commence or complete, or for a given module, software, or system to respond, and generally invokes that the response or performance time is, in ordinary user perception and considering the technological context, effectively generally contemporaneous with a reference event. Those of ordinary skill in the art understand that "real time" does not literally mean the system processes input and/or responds instantaneously, but rather that the system processes and/or responds rapidly enough that the processing or response time is within the general human perception of the passage of real time in the operational context of the program. Those of ordinary skill in the art understand that, where the operational context is a graphical user interface, "real time" normally implies a response time of no more than one second of actual time, with milliseconds or microseconds being preferable. However, those of ordinary skill in the art also understand that, under other operational contexts, a system operating in "real time" may exhibit delays longer than one second, particularly where network operations are involved.

Throughout this disclosure, the term "transmitter" refers to equipment, or a set of equipment, having the hardware, circuitry, and/or software to generate and transmit electromagnetic waves carrying messages, signals, data, or other information. A transmitter may also comprise the componentry to receive electric signals containing such messages, signals, data, or other information, and convert them to such electromagnetic waves. The term "receiver" refers to equipment, or a set of equipment, having the hardware, circuitry, and/or software to receive such transmitted electromagnetic waves and convert them into signals, usually electrical, from which the message, signal, data, or other information may be extracted. The term "transceiver" generally refers to a device or system that comprises both a transmitter and receiver, such as, but not necessarily limited to, a two-way radio, or wireless networking router or access point. For purposes of this disclosure, all three terms should be understood as interchangeable unless otherwise indicated; for example, the term "transmitter" should be understood to imply the presence of a receiver, and the term "receiver" should be understood to imply the presence of a transmitter.

Throughout this disclosure, the term "detection network" refers to a wireless network used in the systems and methods of the present disclosure to detect the presence of biological mass interposed within the communications area of the network. A detection network may use general networking protocols and standards and may be, but is not necessarily, a special-purpose network. That is, while the nodes in the network could be deployed for the specific purpose of setting up a wireless detection network according to the present invention, they need not be and generally will not be. Ordinary wireless networks established for other purposes may be used to implement the systems and methods described herein. In some embodiments, the detection network uses a plurality of Bluetooth™ Low Energy nodes, but the present disclosure is not limited to such nodes. Each node may act as a computer with an appropriate transmitter and receiver for communicating over the network. Each of the computers may provide a unique identifier within the network whenever transmitting a message such that a receiving computer is capable of discerning from where the message originated. Such message origination information will usually be critical to the functioning of the invention as described in this detailed description. The receiving computer may then analyze the incoming signal properties, including but not limited to, signal strength, bit error rate, and message delay. The detection network may be a mesh network, which means a network topology in which each node relays data from the network.

Throughout this disclosure, the term "node" refers to a start point or endpoint for a network communication, generally a device having a wireless transceiver and being a part of a detection network. Nodes are generally standalone, self-contained networking devices, such as wireless routers, wireless access points, short-range beacons, and so forth. A node may be a general-purpose device or a special-purpose device configured for use in a detection network as described herein. By way of example and not limitation, a node may be a device having the wireless transmission capabilities of an off-the-shelf wireless networking device with the addition of specialized hardware, circuitry, componentry, or programming for implementing the systems and methods described herein; that is, for detecting significant changes to signal properties, including but not limited to, signal strength, bit error rate, and message delay. Within a detection network, each node can act as both a transmitter of signal to the network, as well as a receiver for other nodes to push information. In the preferred embodiment, the nodes utilize Bluetooth™ Low Energy (BLE) as a wireless networking system.

Throughout this disclosure, the term "continuous" refers to something happening on an ongoing basis over time, whether such events are mathematically continuous or discontinuous. The generally accepted mathematical definition of "continuous function" describes a function without holes or jumps, generally described by two-sided limits. The technology described herein is based upon disturbances to an electromagnetic or similar wave-based system, in which the transceivers transmit at discrete intervals, and the received raw data is taken discretely (i.e., at discrete time intervals). The resulting data in itself may be discrete in that it captures the characteristic of the system during a particular observation window (i.e., the time interval). In a physical or mathematical sense, this mechanism is essentially a set of discrete data points in time, implying a discontinuous function. However, in the context of the technology, one of ordinary skill in the art would understand a system exhibiting this type of behavior to be "continuous" given that such measurements are taken on an ongoing basis over time.

As used herein, the terms "or" and "and/or" shall have the same meaning, which shall both have the meaning of an "inclusive or."

Figure 2:
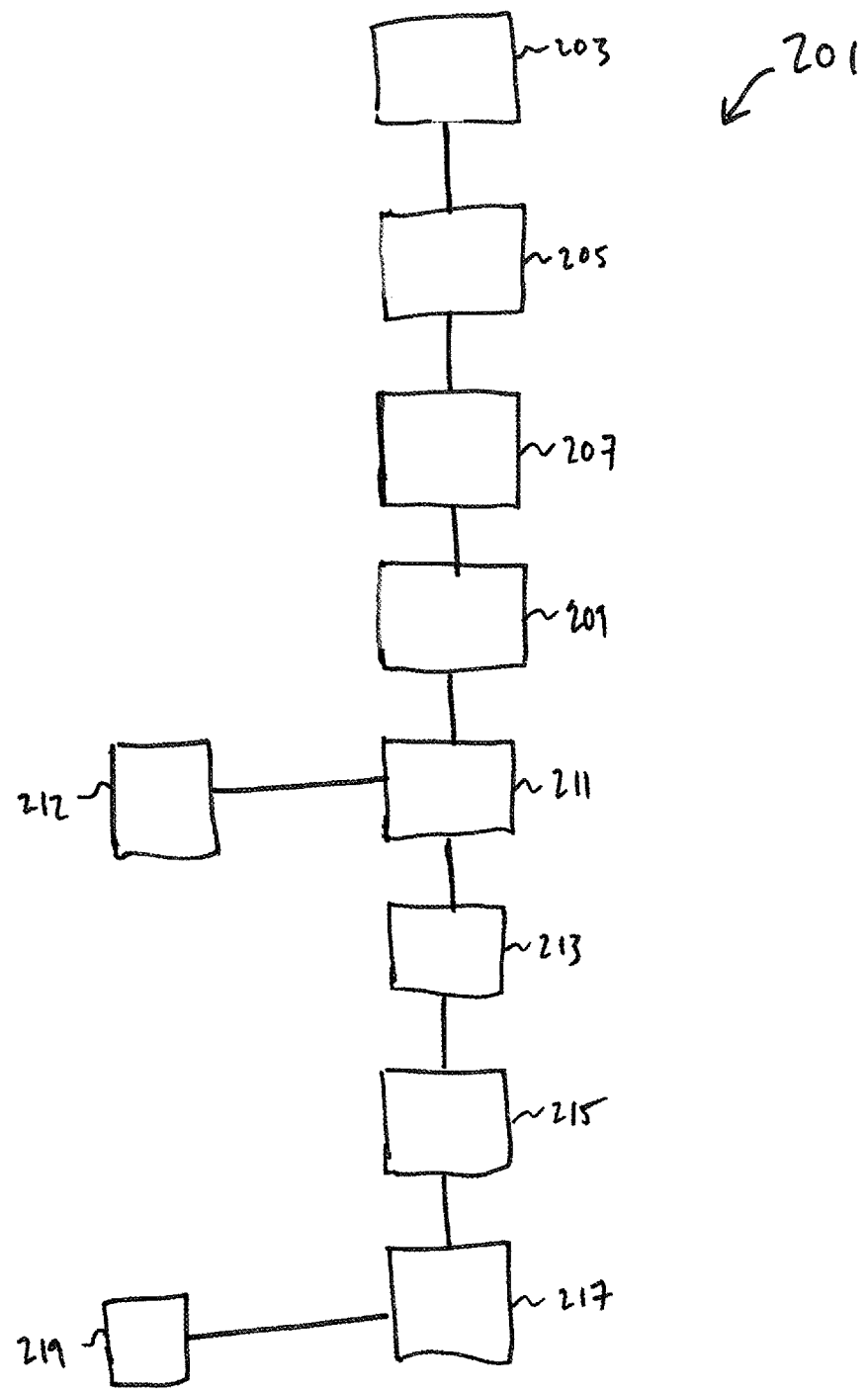
FIG. 2 depicts a flow chart of an embodiment of a method according to the present disclosure.

This application should be understood with respect to the systems and methods for detecting the presence of a human within a detection network, or "Network Presence Sensing" (NPS) described in U.S. Utility Pat. Nos. 10,064,013, 10,455,357, 9,693,195, and 9,474,042, as well as United States Provisional Patent Application Nos. 62/252,954, filed Nov. 9, 2015, and 62/219,457, filed Sep. 16, 2015. The disclosures of all of these documents are incorporated herein by reference in their entirety. Various aspects of these disclosures are discussed herein, including NPS, which is, at a high level, the inference of the presence of humans within a detection network based on changes in the characteristics of wireless network signals caused by the absorption of wireless waves caused by the water mass of the human body within the detection network. FIG. 1 is a schematic diagram of a system and method for NPS according to the above references. FIG. 2 depicts an embodiment (201) of a method for NPS according to the above references.

However, one of ordinary skill will understand that other systems and methods can be used to detect the presence of a human, or a particular human, to which the system can proactively initiate communication or action based on that presence and which do not utilize a fiducial element as a proxy for a human being. One aspect of NPS systems of the type contemplated for use herein is their granularity. As discussed in the above referenced patent documents, it is important that an NPS system detect an actual human, not a fiducial element that is used to proxy a human, although fiducial elements may be used in the system to augment the system's abilities or otherwise improve the system.

The detection of a human versus the detection of a fiducial element as a proxy for a human is often a difficult distinction to understand as many modern technologies, and in fact language, interchange the two concepts even though they are quite distinct. A simple way to think about the difference is to consider a traditional "you are here" sign. These signs were static presentations including an unchanging picture of a map which included an arrow or dot pointing to a particular location and indicating "you are here".

It should be readily recognized, however, that the dot or arrow, and the sign itself, did not actually indicate the location of the reader or have any idea as to the location of the reader. Instead, the arrow or dot (if the sign was placed correctly) indicated the location of the sign itself. As indicated above, the sign (including the location of the arrow) was unchanging and fixed and therefore it was impossible for the sign to indicate the location of any human much less the large number of humans that may look at it over the course of a single day. Instead, the sign acted as a proxy for the reader's location because the reader was presumed to be sufficiently close to the sign to be looking at it and therefore the location of the sign (which was fixed and shown on the sign itself) could be used as a general indicator of the location of an expected reader of the sign attempting to determine where they were. This type of proxy indication of location is ubiquitous due to the proliferation of handheld computing devices. Location and mapping systems on these indicate the location of the device, not the location of the user, but to use the location system the user typically has to be in proximity to the device and therefore the device (as fiducial element) can act as a proxy of the location of the user.

Throughout this disclosure, the term "proxy" will be used to refer to any device which may act as a proxy as to the location of another object. That is, it is a device whose location is expected to generally conform to the location of the object associated with the device. This may be, for example, the human user of the device, an owner of the device, or a thing generally connected with the device. A fiducial element as discussed herein may act as a proxy as discussed later. An NPS system, however, is a system which is designed to detect an actual object, not a proxy for the object.

A further element is that an NPS system will generally be able to differentiate the presence of multiple humans from the presence of a single human. In effect, an NPS system of use in the present systems and methods needs to know where any human is within its sensing area and if a human is or is not within the sensing area. Traditional systems based on "sensing" humans (e.g., motion detectors) are not able to do this as they cannot differentiate signals and simply can tell only if at least one human (or something thought to be human) is present.

The present disclosure may include systems and methods for recognizing and including devices in a detection network on an ad hoc basis. This has the effect of such devices being part of both an independent primary function network (e.g., the network functions for which the device is configured for use according to its intended purpose), as well as part of a secondary function network (meaning a detection network implementing NPS technology). The present systems and methods may facilitate a plurality of unrelated devices from different manufacturers, and having different primary functions, cooperating in a secondary function network in which they can share functionality. The present invention may include the use of fiducial elements to augment or otherwise assist in implementing the NPS technology.

FIG. 1 is a schematic diagram of a system (101) and method according to the present disclosure. In the depicted embodiment (101) of FIG. 1, a detection network (103) comprising a plurality of nodes (107) is disposed within a physical space (102), such as a room, corridor, hallway, or doorway. In the depicted embodiment of FIG. 1, an indoor space (102) is used, but the systems and methods described herein are operable in external environments as well. In the depicted embodiment, a node (107A) is communicably coupled (111) to a telecommunications network (115), such as an intranet, an internet, or the Internet. A server computer (109) may also be communicably coupled (113) to the telecommunications network (115) and thereby with the connected node (107A). The depicted server (109) comprises programming instructions for implementing the systems (101) described herein, and carrying out the method steps described herein. However, in an embodiment, the functions performed by the server (109) may be performed by one or more nodes (107) having the appropriate software/programming instructions, or being appropriately modified. In yet other embodiments, any computing device may be used to carrying out the method steps described herein.

In the depicted embodiment (101) of FIG. 1, each of the nodes (107) is communicably connected with at least one other node (107) in the detection network (103), and may be communicably connected to two or more, or all of the other nodes (107) in the detection network (103). For example, in a typical wireless network deployment strategy, a plurality of wireless access points is placed throughout the physical space (102), generally to ensure that a high-quality signal is available everywhere. These nodes (107) collectively form a detection network (103) and may transmit data to one another, or may transmit only to a router or set of routers. In the depicted embodiment (101) of FIG. 1, the node (107A) is a wireless router, and the other nodes (107B), (107C) and (107D) are wireless access points. However, this is just one possible configuration. Further, it is not necessary that any given node (107) be a particular type of wireless device. Any number of nodes (107) may comprise a router, access point, beacon, or other type of wireless transceiver. Further, any number of nodes (107) may be present in an embodiment, though a minimum of two is preferred. More nodes (107) in a space (102) may increases the amount of data collected by the system (101), thus improving the chance that a human is generally interposed between at least two nodes (107), improving the location resolution.

Further, in the systems (101) and methods described herein, the detection network (103) may be capable of recognizing and determining the location of a fiducial element (105). In particular, as described briefly above, a fiducial element (105) may be any device that is capable of transmitting a signal to the network (103) in a manner that allows the network (103) to determine where the fiducial element (105) is located within the physical space (102) based at least in part on the transmitted signal. In some embodiments, the fiducial element (105) may be capable of determining its own location and transmitting this information to the detection network (103). In such an embodiment, any method known to persons of ordinary skill in the art may be used to make such a determination. Methods include, without limitation, the use of GPS, other positioning systems, triangulating using known transmitters (such as the nodes (107)), dead reckoning, or any other acceptable method. In other embodiments, the fiducial element (105) may transmit a signal that, once received by one or more nodes (107) or other detection equipment, may allow the detection network (103) to determine where the fiducial element (105) is located within the physical space (102). Any method known to persons of ordinary skill in the art may be used to make such a determination, including, without limitation, triangulating using known receivers (such as the nodes (107) themselves).

In any case, the embodiment of the system (101) and methods herein will be able to use the additional data from the fiducial element (105) regarding the location of the fiducial element (105). This additional data may be used to reinforce other data, reduce overall computation requirements, train the system (101), highlight particular data, deemphasize particular data, or the like. In any case, the additional data may be used in any manner as would be understood by persons of ordinary skill in the art.

In the ordinary course of operation, the nodes (107) frequently send and receive wireless transmissions. For example, when a wireless router (107A) receives a data packet, the wireless router (107A) typically broadcasts a wireless transmission containing the packet. This means that any receivers within the broadcast radius of the router (107A) can receive the signal, whether or not intended for them. Likewise, when an access point receives local data, such data is likewise broadcast and can be detected by other access points and the router. Even when no user data is actively transmitted on the network, other data is frequently transmitted. These other transmissions may include, without limitation, status data, service scans, and data exchange for functions of the low-level layers of the network stack.

Thus, each node (107) in a typical detection network (103) receives transmissions on a consistent basis and, in a busy network, this effectively may be a continuous basis. The detection network (103) may thus be used to calculate the existence and/or position of a biological mass (104) physically interposed within the transmission range of the network (103). Because the presence of a human body (or any other biological mass (104) of sufficient size) impacts the characteristics of signals transmitted between or among nodes (107) within the network (103), such presence can be detected by monitoring for changes in such characteristics. This detection may also be performed while the data in the data packets being transmitted and received is still being transmitted and received; that is, the detection is incident to ordinary data exchange between or among two or more nodes (107), which continues regardless of the detection. Specifically, the wireless network may operate to transfer data between nodes (107), while simultaneously using characteristics of how the data packets incorporating that data have been impacted by the presence of an object in the transmission path, to detect and locate the biological mass (104).

In the depicted embodiment (101) of FIG. 1, at least one node (107) monitors the communication signatures between itself (107) and at least one other node (107) for statistically significant changes in signal characteristics even while it awaits, receives, and/or transmits communications between itself and other nodes (107). The particular geometry of the physical space (102), including the presence and location of fixtures in the physical environment, generally does not impact the system (101) because the monitoring is for statistically significant change in signal characteristics indicating or evidencing the characteristics of a human. That is, a change in signal characteristics is attributable to a change in absorbers or reflectors, like human bodies, in the physical environment or communication space covered by the detection network (103).

The detection of the presence of a human within the detection network (103) may be done using statistical analysis methods on the signal, such as using sensing algorithms. Again, this does not require the human to be associated with a fiducial element or in motion. Instead, the detection network (103) detects that characteristics of the network communication have changed because a new object (which may be a human object) has been introduced in the communication space and the presence of that object has caused a change to the characteristics of the network communications, typically data packets, between nodes (107).

To detect a change, generally a baseline of signal characteristics is developed against which recently transmitted signals are compared. These characteristics are derived from typical wireless communication network diagnostic information. This baseline of signal characteristics between nodes (107) is generally established prior to the use of the detection network (103) as a detector. This may be done by operating the detection network (103) under typical or normal circumstances, that is with the detection network (103) communicating data packets, with no significant biological mass (104) interposed in the physical broadcast space of the detection network (103). For an amount of time during such operation, signal characteristics between and/or among nodes (107) are monitored and collected and stored in a database or other memory. In an embodiment, the server (109) will receive and store such data, but in other embodiments, one or more nodes (107) may comprise hardware systems configured to receive and/or store such data.

For example, where a node (107) contains special purpose hardware and programming for use according to the present disclosure, such node (107) may store its own signal characteristic data. Such signal characteristic data may be data relating to the received energy characteristic of signals received by a particular node (107) from one or more other nodes (107). The baseline data establishes for each node (107) a signature characteristic profile, which is essentially a collection of data defining the typical and/or general characteristics of signals received by the node (107) under ordinary operating circumstances where there is no significant biological mass (104) interposed in the detection network (103). The node (107) may have one (or more) such profile for each other node (107) from which it receives data.

In an embodiment, after the baseline signatures have been detected and collected, the detection network (103) will generally continue to operate in the same or similar fashion, but may now be able to detect the presence of a biological mass (104). This may be done by detecting and collecting additional signal characteristics, generally in real time, as the detection network (103) operates in a normal mode of transmitting and receiving data packets. These newly generated real time signal characteristic profiles are also generally characteristics of signals between two particular nodes (107) in the detection network (103), and thus can be compared to a corresponding baseline signal characteristic profile for the same two particular nodes (107). A statistically significant difference in certain characteristics between the two profiles may then be interpreted as being caused by the presence of a significant biological mass (104), such as a human.

The comparison operations may be performed by appropriate hardware in a given node (107), or the real time signal characteristic profiles may be transmitted to a server (109) for processing and comparison. In a further embodiment, both are done so that a copy of the real time data is also stored and accessible via the server (109), effectively providing a history of signal characteristic profiles. These signal characteristic profiles may be used as additional baseline signatures.

This is because, as described herein, a biological mass (104) interposed within the detection network (103) will generally cause at least some signal characteristics between at least two nodes (107) to change when a data packet is transmitted which intercepts and/or generally interacts with the biological mass (104). The degree and nature of the change generally will be related to the nature of the particular biological mass interposed (e.g., the size, shape, and composition), and its location in the network (103). For example, when a housefly flies through the detection network (103), the amount of signal change may be so minor as to be indistinguishable from natural fluctuations in signal characteristics. However, a larger mass, such as a human, may cause more substantial and statistically significant changes in signal characteristics.

Such changes may not necessarily manifest in all signal characteristic profiles for the detection network (103). For example, where the mass (104) is interposed at the edge of the detection network (103), the nodes (107) nearest that edge are likely to experience statistically significant signal characteristic changes, whereas nodes on the opposing side of the detection network (103) (whose signals to each other do not pass through or around the biological mass (104)), are likely to experience few or no statistically significant changes. Thus, if the physical locations of the nodes (107)

are also known, the system (101) can determine not only that a biological mass (104) is present in the detection network (103), but calculate an estimate of where it is located, by determining which nodes (107) are experiencing changes and calculating the magnitude of those changes. Such changes across the entire detection network (103) for any given disturbance may also be compared with prior data across the entire detection network (103) where the size and location of the biological mass (104) was known. This can allow for comparison against specific baselines to estimate location, or for training of a neural network or similar "artificial intelligence" (AI) engine.

A biological mass (104) that is smaller than a human but bigger than a fly, such as a dog or other household pet, may also cause a substantial and statistically significant change in the received signals for the detection network (103). The signal changes detected may be less than that for a full-sized human while also being observable. Detecting these differences may allow the detection network (103) to differentiate between individuals of different sizes, such as the differences between children and adults. Additionally, these differences may allow the detection network (103) to differentiate between humans and other objects, such as pets or other animals. The system (101) may store, in addition to the baseline signatures formed without a biological mass in the space (102), additional baseline signatures with various different biological masses. These additional baseline signatures may assist the system (101) in making more accurate and precise detections, and may allow the system (101) to differentiate between different classes of biological masses.

The process of detecting a biological mass (104) can be seen in the depicted embodiment (101) of FIG. 1. In FIG. 1, assuming that only one human—person A (104)—is present at a time for simplicity, A (104) would generally have a greater impact on the signal characteristics between nodes (107C) and (107A) than between nodes (107A) and (107C). Further, A (104) would also generally have a small bidirectional effect on the signal characteristics between nodes (107B) and (107D). By contrast, entity B (106)— who may or may not be a human but also is carrying a fiducial element (105)— would have a bidirectional impact on the signal characteristics between nodes (107A) and (107C), as well as on the signal characteristics between nodes (107B) and (107D).

While all nodes may be communicating with one another, the effects of A (104) and B (106) will generally be more negligible on communications where A (104) and/or B (106) are not generally in line with the communications path between nodes (107). For example, neither person A (104) nor entity B (106) is likely to seriously impact transmission between nodes (107A) and (107B) because neither person A (104) nor entity B (106) is in the transmission path between those nodes. However, A (104) may have an impact on transmissions between nodes (107C) and (107D).

It should be noted that the presence or absence of a biological mass (104) or (106) within the communication area of the detection network (103) will not necessarily result in any change in data communication. It is expected that the detection network (103) will utilize its standard existing protocols, means, and methods (including all forms of retransmission and error checking) to make sure that the data in the data packets being transmitted is correctly received, processed and acted upon. In effect, the detection process of the detection network (103) is performed in addition to the standard data communication of the detection network.

It should be recognized from this that the data in the data packets being communicated by the nodes (107) in the detection network (103) generally will not be directly used to detect the biological mass (104) or (106) within the communication area of the detection network (103). Instead, the data will simply be data being communicated via the detection network (103) for any reason and will often have nothing to do with detection of the biological mass (104) or (106). Further, while this disclosure generally contemplates packetized communication in the form of data packets, in an alternative embodiment, the data may be continuously communicated in a non-packetized form.

In an embodiment, in order to allow the detection network (103) to detect the presence or absence of a particular biological mass, the system includes a training aspect or step. This aspect may comprise, after the baseline characteristics without a biological mass are established, one or more entities, which may or may not be humans, may be deliberately interposed in the detection network (103) at one or more locations in the network (103), and one or more additional sets of baseline characteristics may be collected and stored. These additional baseline characteristics may be used for comparison purposes to improve accuracy in detecting the size, shape, and/or other characteristics of a biological mass interposed in the detection network (103), and/or for improving the accuracy of location determination. Such training may use supervised or unsupervised learning, and/or may utilize techniques known to one skilled in the art of machine learning.

One concern in all methods of identifying the location of a biological mass is that there are multiple variables affecting the detection. As a simple example, a larger mass at a first location may produce sufficiently similar disruption to a smaller mass at a second location as to make a determination between the two possibilities indistinguishable. Recognizing that biological masses exist at virtually any point within a wide spectrum of sizes and the position of the mass can be virtually anywhere within the detection network (103), it can be difficult to select a specific detection location and size from the set of available options for any specific data point. This can be dealt with in certain circumstances by limiting the available spectrum depending on what is being looked for (for example, human beings typically have an average and maximum size substantially less than horses) or where it is generally expected to be (a human would be expected to be on the floor and not hovering in the air, for example), this may not provide enough limitation to reduce a detection determination to a particular mass at a particular location.

In an embodiment, an entity B (106) carrying a fiducial element (105) may be used to help correlate known characteristics of the entity B (106) while having additional data on the real time location of entity B (106) to assist. This additional data may enhance the additional baseline process described herein. For example, the use of a fiducial element (105) may increase the accuracy of the additional baselines established for the individuals using the fiducial element (105). In other cases, the use of a fiducial element (105) may reduce time required to make the additional; baselines established for the individuals using the fiducial element (105). In both cases, the additional location data from the fiducial element (105) may assist in determining where the entity B (106) is at any given time within the physical space (102). Further, the fiducial element (105) may have additional uses beyond establishing additional baselines, as will be discussed more fully below.

In an embodiment, a detection network (103) may use a specialized protocol comprising a controlled messaging structure and/or format, which can be controlled from one node (107) to another (107), making it simpler and easier to determine from which node (107) a message originated, and allowing for control of aspects such as the composition of the signal sent, transmitted signal strength, and signal duration. Such control may further facilitate certain improvements in processing, and may facilitate receivers identifying and using certain signal qualities and/or characteristics particular to the detection aspects of the network (103), which may differ from general networking aspects sharing the same network (103). With control of the message sent and received on the opposing sides of the mass being located, it is not necessary to send a signal as a scan, nor to sweep a region in space, as such functions tend to require significantly more expensive equipment than is needed for typical broadcast or directional transmission between nodes (107). Messages are generally constructed in such a way as to best produce usable data for detection algorithms which would be constructed to function best with the communication network they are being used within. Generally, such constructions still avoid the need for waveform level analysis of the signals sent by the network.

In the depicted embodiment, each node (107) generally is able to determine the origin node (107) of packets received by such node (107). Such message origination information is typically encoded within the message itself, as would be known to one skilled in communications networks. By way of example and not limitation, this may be done by examining data embedded in established protocols in the networking stack, or by examining data transmitted by the sending node (107) for the specific purpose of implementing the systems (101) and methods described herein. Typically, each node (107) has appropriate hardware and processing capability for analyzing the messages received. While many different topologies and messaging protocols would allow for the functionality described herein, generally mesh networking topologies and communication methods will produce usable results.

FIG. 2 depicts an embodiment (201) of a method according to the present disclosure and should be understood in conjunction with the system of FIG. 1. In the depicted embodiment, the method begins (203) with the establishment (203) of a detection network (103) comprising a plurality of communication nodes (107) according to the present disclosure. As would be known to one skilled in the art of setting up communication systems, there are many different approaches to the setup of such a network (103) and many different network (103) topologies may prove viable within this framework.

Next, a digital map in memory may be generated (205) indicating the detection network's (103) physical node (107) geometry. The detection algorithms applied herein generally use information about where in the physical environment (102) the nodes (107) are deployed. Data about such physical location of the nodes (107) may be supplied manually to form an accurate diagram of the physical network environment (102), and/or software could be used to automatically generate a relational position map of one or more nodes (107) within the detection network (103), which software may facilitate easier placement of the nodes (107) into such an environment map or diagram.

Alternatively, nodes (107) may be placed on a blank or empty map or diagram using relational (as opposed to absolute) distances for detection. In such a dimensionless system, messages could still be generated from the algorithms related to the detection of humans or other objects in the system (101), and additional manual processing may be included, such as user input concerning which messages are sent related to the presence and/or movement of humans (or objects) within the network (103).

In an embodiment with automatic node (107) location detection, node (107) locations may be detected algorithmically and/or programmatically by one or more nodes (107) and/or a computer server (109), based upon factors such as, but not necessarily limited to: detection network (103) setup and configuration, including physical location of specific hardware components such as nodes (107) and each node's (107) location relative to one or more other nodes (107); signal strength indicators; and transmission delay. In the depicted embodiment (201), this step (205) further comprises overlaying the generated map on a digital map of the physical space (102) or environment (referred to herein as an "environment map") that the detection network (103) occupies, such as floor plan of a building. This step (205) may further and optionally comprise a scaling element to align the scales of the generated map to the environment map, as well as user-manipulated and/or modifiable input elements for making adjustments to fine-tune the generated map so that it more closely conforms to the actual node (107) deployment geometry, as would be understood by one of ordinary skill in the art. In an alternative embodiment, each node (107) may be manually placed in its appropriate location on the environment map without using a relative location algorithm.

Either way, this step (205) may establish the physical locations of the nodes (107) in the detection network (103), which will facilitate determination of the location of interposed biological masses (104) attributable to the presence of humans (or other entities) within the detection network (103). By placing the nodes (107) on a map (either through manual or automatic means), the nodes (107) can track the presence of a human in the network (103) based on how the baseline signal compares to the detected effects on communications between various nodes (107). The system (101) may utilize information collected about the signals which arrive at the receivers, given a transmitted set of information known to the data processing algorithms used. The data processing algorithms are what ultimately determine whether a human is present within the network (103) and/or where within the network (103) that human is located.

Next, messages are constructed and exchanged (207) in a format, and according to a protocol, determined to be suitable for detecting the presence of a biological mass (104) within the detection network (103). While this may be done using general purpose networking protocols known in the art, such as protocols in the Open Systems Interconnection (OSI) network model, special-purpose protocols that replace or supplement such general-purpose protocols may alternatively or additionally be used.

Generally, it preferred that this step (207) further comprise controlling and/or modifying messages passed within the detection network (103) for the specific purpose of detecting human presence and facilitating simplified statistical analysis. By controlling (207) message exchange, the system (101) can adjust for a common content being sent through the detection network (103) while also facilitating adjustment of parameters including, but not necessarily limited to: transmission intervals; transmission power; message length and/or content; and intended message recipient (s). Again, the system (101) does not necessarily rely on waveform level analysis, allowing operation within the confines of wireless communication standards.

Controlling (207) such parameters facilitates the development of statistics and/or analytics, which may be based at least in part on pre-defined or anticipated message content or characteristics. Such content and/or characteristics may include, without limitation, transmission timestamp and/or transmission power level. By controlling and modifying (207) these aspects, one may overcome hardware limitations, including hardware features which cause unwanted consequences when used in a detection network (103) according to the presence disclosure, such as but not necessarily limited to automatic gain control (AGC) circuits, which may be integrated into certain receiver hardware in a node (107).

Next in the depicted embodiment (201), the space (102) is cleared (209) of significant biological mass (104)—notably humans (205). Then, a statistical baseline of signal strength is developed (211) locally by each node (107). Again, by placing the nodes (107) on a map in step (205), whether through manual and/or automatic means, the nodes (107) can track the presence of a human in the network (103) based on how the baseline signal is affected for communication between nodes (107). The massless baselines may be augmented by the creation of additional baselines including biological masses, as discussed above.

In some embodiments, the process of developing a statistical baseline (211), including additional baselines (211) using known entities, may be augmented (212) with the use of a fiducial element (105). In particular, the fiducial element (105) may assist the system (101) in locating the entity holding the fiducial element (105) in a variety of ways while creating additional baselines including the biological mass (106) holding the fiducial element (105). As discussed above, in an embodiment, the fiducial element (105) may be capable of determining its own location and transmitting this information to the detection network (103). In such an embodiment, any method know to persons of ordinary skill in the art may be used to make such a determination. Methods include, without limitation, the use of GPS, other positioning systems, triangulating using known transmitters (such as the nodes (107)), dead reckoning, or any other acceptable method. The fiducial element (105) may send this location data to the detection network (103) continuously or periodically.

When the system (101) receives this position data from the fiducial element (105), the position data may be used to correlate the changes in the signals received at each node (107) with the received position data from the fiducial element (105). This may allow for more accurate, or quicker, additional baseline formation. This may assist in training the system (101) to detect humans (or other entities) by storing real-world additional baselines where humans (106) are positioned at different points within the physical space (102). And by storing these additional baselines, the system (101) may be capable of detecting the presences of humans (or other entities) with increased precision or speed.

In other embodiments, the fiducial element (105) may transmit a signal that, once received by one or more nodes (107) or other detection equipment, may allow the detection network (103) to determine where the fiducial element (105) is located within the physical space (102). Any method known to persons of ordinary skill in the art may be used to make such a determination, including, without limitation, triangulating using known receivers (such as the nodes (107)). Similar to the above usage of a fiducial element (105), this triangulation may produce position data, which position data may be used to correlate the changes in the signals received at each node (107) with the produced position of the fiducial element (105). This process may also allow for more accurate, or quicker, additional baseline formation. And again, by storing these additional baselines, the system (101) may be capable of detecting the presences of humans (or other entities) with increased precision or speed.

Next, a biological mass enters (213) the detection network (103), causing signal absorption and other distortions, which manifest in changes in signal characteristics between nodes (107). These changes are detected (215) and analyzed (217) to determine whether the changes are indicative of the presence of a human, or of another type of biological mass the detection network (103) is configured to detect. Such detections are further localized at least to an area between nodes, such as within an interior area between three nodes (107) on the network, but possibly with greater accuracy depending on the algorithms and hardware being in use at the time.

Generally, this is done using detection algorithms executed either by one or more nodes (107) or by a server computer (109). The nodes (107) and/or server (109) use software to estimate the location of the detected biological mass (104) in the detection network (103) using one or more detection algorithms. Such algorithms generally compare the baseline and additional baseline profiles to newly detected signals, and may also use or be based upon various data and other aspects, such as, without limitation: detection network (103) setup and configuration, including physical location of specific hardware components such as nodes (107) and each node's (107) location relative to one or more other nodes (107); signal strength indicators; and transmission delay.

Generally speaking, as described elsewhere herein, these algorithms include comparing newly gathered signal characteristic profiles (215) to baseline signal characteristic profiles (211) to identify a change and determine whether, based on the nature of the change, the change is indicative of the presence of a human. This determination may be done at least in part using training data developed through machine learning as described elsewhere herein.

In an embodiment, the detection algorithms may further comprise the use of observed signal characteristic change(s) between one or more pairs of nodes (107) in the detection network (103), correlated in time and relative effect. These factors facilitate the identification of a physical location in the detection network (103) where such a signal change took place, allowing for an estimate of the physical location of the human (or other object) causing such signal characteristic change(s), which in turn may be used to estimate a physical location in the detection network (103) environment where the biological mass (104) is interposed. Such physical location may be provided as simple x, y, z coordinates according to a coordinate system, or may be visually indicated, such as on the map.

The processes for detecting (215) and analyzing (217) changes in signal characteristics between nodes (107) typically require considerable computational resources. The detecting (215) of changes may require the ingestion of an amount of data, which may be large. Further, the devices performing the detection (215), such as the nodes (107) in some embodiments, may simultaneously be performing other functions. Further, the analyzing (217) of this data may require significant resources to move around and process the data. Similar to the devices performing the detecting (215), the devices performing the analyzing (217), such as the nodes (107) in some embodiments or the server (109) in some other embodiments, for example, may simultaneously be performing other functions. All of this processing, moving, storing, or otherwise interacting with data may require significant computational resources or time.

The system (101) described herein may be applied to a multitude of applications, some of which will now be discussed as non-limiting examples. For example, the system (101) may be used for at least the following actions within a space (without being limited to these actions): (a) detect changes; (b) detect presences; (c) count people; and (d) locate people. Within each of these applications, there may be differences in the quality and the character of the data required to fulfill the needs of a given application. Further, these different applications fundamentally operate on the same data set and, given sufficient processing power, can be run simultaneously. As will be discussed below, different applications will have different needs.

For example, lighting applications favor fast detection times for a person entering a space, so that the lighting may be adjusted for that person quickly. Further, accuracy in this application is not paramount because the results of false-positive or false-negative detections are relatively benign. However, there is much less of a need for quick speeds when detecting that the person has left the space, so that the lighting may be adjusted to an unoccupied lighting condition.

Typically, the timing needed to provide an occupied lighting condition is on the order of one second. On the other hand, for a security application, the needs may be different. In some security applications, for example, when monitoring a space that is intended to be unoccupied, accuracy is paramount but timing may be relatively slow (on the order of 30 seconds). This is because a determination that a space is occupied for a security application typically results in a higher level intervention when compared to a lighting application—for example, security personnel may be called to the space. And further, security need not be called immediately because greater response times are acceptable for alerting security.

On the other hand, in a lighting application, the lights are merely adjusted, which often means turned on or up in intensity so that the person entering the space may see comfortably. And people desire the most comfortable lighting quickly because they cannot see properly without it. These two applications clearly have different needs for timing and accuracy, and as a result, have different data processing needs, which data processing needs are relevant to the system (101) discussed herein.

Generally speaking, accuracy may be increased by increasing the data considered and by increasing the amount of baseline data used in comparisons. The more baseline information available, the more accurate presence detection may be, and often the more quickly determinations may be made. However, increases in the processing of data may increase the time required for any given detection scenario. As discussed above, the system (101) herein typically develops a plurality of baselines (211) both without persons present (a baseline) in the space and (often) with persons present in the space (additional baselines). These baselines can then be compared to current detections in the system (101) to determine if any person is present in the space (102). For the contemporaneous collection and use of data for determining if a person is present in a space, one of two main configurations strategies are used: (a) user input or (b) training input.

For user input, typically a user may either increase from the lowest system settings until human-related activity events are detected in a satisfactory time or decrease from the highest setting until the false-positive rate is at an acceptable rate. The most direct way to accomplish this configuration is through a focused period of active training of the system (101), during which the user follows a methodical procedure in which they adjust settings as they perform events in and around the space. Alternatively, over a longer, designated, passive calibration period, the user may adjust settings depending on desired response to real-world, observed events. These settings may balance the responsiveness of the system's (101) detection algorithms while maintaining acceptable false-positive and false-negative detection rates for the desired applications of the system (101).

For training input, this configuration methodology typically involves feeding training input into the NPS algorithms from various sources to reach an acceptable configuration without the need for real-world user input. These training inputs may include, without limitation, internal sources (such as supplementary algorithms or NPS detection area outputs) or semi-trusted external sources (such as location provided by a GPS-enabled device; analyzed sounds or other known user inputs as detected by smart speakers; detections from prior motion detectors or other known sensors; and any other know means of detecting humans). One or more of these inputs may be used as training inputs into the system (101) to associate network characteristics before and after human-related events, essentially building the system's (101) baseline repository. Over time, the system (101) gains confidence in distinguishing between these different data sets and continues to enhance its performance beyond the training input sources alone. Further, the system (101) may use data derived from any given physical space (102) when training another physical space (102). While each physical space (102) is generally treated as separate from all other spaces (102), broad-spectrum environmental factors seen by adjacent or otherwise related spaces (102) may be useful for each of those spaces (102).

In the system (101) described herein, one particular concern may be preventing false-positive detections based on the presence of non-human entity within the physical space (102). For example, such non-human entity may be a pet, such as a dog. Various applications for the system (101) may find preventing such false-positive detections useful, including both the lighting and security applications discussed above. This may be especially useful for security applications or for any other applications that have a low tolerance for false-positive detections. The system (101) may avoid pet-based detections by either training the baseline models to identify and track pet-related activity events or by using a fiducial element (105) attached to any pet (or other entity that the user desires not to be detected) to assist in detection (219).

When an entity carries a fiducial element (105), which has been described above, the system (101) may be capable of locating the pet/fiducial element (105) and analyzing the network diagnostic information generated by the nodes (107) or server computer (109) in combination with the data supplied by or because of the fiducial element (105). This additional location data may allow the system (101) to ignore the pet or otherwise prevent detections (219) based on the actions of the pet. The pet may be any non-human entity. Typically, the pet will have less biological mass than an adult human. However, in other embodiments, the pet may be anything, including a human, whose actions are desired to be ignored by the system (101) or otherwise prevented from causing detection within the system. For example, the entity with the fiducial element (105) may be a janitor within an office space, wherein the janitor's movements throughout the space are not desired to cause a detection (219). In other examples, the pet may be a dog, a cat, or any other animal. The pet may carry the fiducial element (105) in any manner known to persons of ordinary skill in the art. Options to carry include, without limitation, a tag, a collar, a badge, a card, an implant, a computer, a mobile device, or any other known type of fiducial element (105).

By tracking known biological masses (106) using a fiducial element (105), the biological masses (106) may be relatively simply ignored by the detection network (103) or rejected by the detection network (103) as being not of interest or not selected target objects. Thus, for example, in a security system, carrying of a fiducial element by a detected biological mass (106) could allow the biological mass (106) to be rejected because the mass (106) represents an authorized employee and not the desired target of an unauthorized intruder. Similarly, a biological mass (106) entering a room may be detected as a pet due to it carrying a fiducial element and thus being rejected as a target human where lights would need to be turned on due to their entry.

Although the detection network (103) will typically need to process the additional data from the fiducial element (105), the network (103) may typically reduce data processing related to the entity (106) carrying the fiducial element (105) once the fiducial element (105) is recognized. Further, the use of a fiducial element (105) may allow the detection network (103) to quickly determine what additional baselines will be most helpful in isolating and removing any detected signal characteristics related to the entity (106) having the fiducial element (105) whenever the fiducial element either identifies itself or is easily identified. Even where the fiducial element (105) does not have a known identity, the additional location data can assist the detection network (103) with learning about the entity's (106) effects on the network characteristics, possibly allowing the detection network to efficiently eliminate the entity (106) from its detection algorithms.

Similarly, as discussed above, the use of a fiducial element (105) may assist in training the system (101) to create new additional baselines (211) that may allow the system (101) to ignore or otherwise or otherwise prevent the pet (or other entity (106)) carrying the fiducial element (105) from causing detection (219) within the system (101). In such a case, once the system (101) has sufficiently been trained on how the pet carrying the fiducial element affects the network characteristics sensed by the nodes (107) or the server computer (109), the fiducial element (105) may be removed and the pet tracked and ignored via only detecting changes in the network characteristics. In some embodiments, the pet may carry the fiducial element (105) in an intentional training exercise to more quickly teach the system (101) to recognize and to exclude the pet from detection.

Further, any of these learned models from the pets can be shared with other portions of the system (101), or even with other, separate systems (101) to assist in developing more robust models for excluding pets or the like. Further, to the extent that the system (101) may recognize and track a pet, the system (101) may use this data to locate such pets and perform other NPS applications on data involving pets or the like. This may allow the system (101) to perform as the user desires with regards to pets or the like.

The systems and methods described herein may be used to implement any of the NPS technologies described in the above-indicated references, including, without limitation, change detection (detecting changes in position of one or more humans within a detection area), presence detection (occupancy sensing within a detection area), counting (estimating the number of humans present in a detection area), locating (locating specific individuals within a detection area), and the like.

While the invention has been disclosed in conjunction with a description of certain embodiments, including those that are currently believed to be useful embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term, which may nevertheless fall short of doing so. This is because terms such as "spherical" are purely geometric constructs and no real-world component or relationship is truly "spherical" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A method for detecting the location of an object within a detection area, the method comprising:
    providing a first transceiver disposed at a first location within a detection area;
    providing a second transceiver disposed at a second location within said detection area;
    a computer server communicably coupled to said first transceiver;
    said first transceiver receiving a first set of wireless signals from said second transceiver when a first object carrying a fiducial element is present within said detection area at a first position;
    said computer server receiving a first set of signal data from said first transceiver, said first set of signal data comprising data about properties of said first set of wireless signals;
    said computer server receiving from said fiducial element, an indicator of said first position;
    said computer server creating a first baseline signal profile for wireless communications from said second transceiver to said first transceiver, said first baseline signal profile being based at least in part on said properties of said first set of wireless signals in said first set of signal data when said first object is present in said detection area at said first position;

said computer server associating said first baseline signal profile with said first position;

said first transceiver receiving a new set of wireless signals from said second transceiver when a new object without a fiducial element is present in said detection area at an unknown position;

said computer server receiving a new set of signal data from said first transceiver, said new set of signal data comprising data about properties of said new set of wireless signals;

said computer server comparing said new set of signal data to said first baseline signal profile; and said computer server indicating said new object is at said first location based on a comparison of said new set of signal data to said first baseline signal profile.

2. The method of claim 1 further comprising:

said first object moving from said first position to a second position in said detection area;

said first transceiver receiving a second set of wireless signals from said second transceiver when said first object is present at said second position;

said computer server receiving a second set of signal data from said first transceiver, said second set of signal data comprising data about properties of said second set of wireless signals;

said computer server receiving from said fiducial element, an indicator of said second position;

said computer server creating a second baseline signal profile for wireless communications from said second transceiver to said first transceiver, said first baseline signal profile being based at least in part on said properties of said first set of wireless signals in said first set of signal data when said first object is present in said detection area at said second position;

said computer server associating said second baseline signal profile with said second position;

said computer server comparing said new set of signal data to said second baseline signal profile; and said computer server indicating said new object is at said second location based on a comparison of said new set of signal data to said second baseline signal profile.

3. The method of claim 2 wherein said first object is a human being.

4. The method of claim 3 wherein said new object is a human being.

5. The method of claim 4 wherein said first object and said new object are the same human being.

6. The method of claim 2 wherein said new object is a human being.

7. The method of claim 1, wherein said properties of said first set of wireless signals comprise wireless network signal protocol properties determined by said first transceiver.

8. The method of claim 7, wherein said each of said wireless network signal protocol properties is selected from the group consisting of: received signal strength, latency, and bit error rate.

9. The method of claim 1, wherein said computer server operates an external system when said computer server indicates said object is at said first location.

10. The method of claim 9, wherein said external system comprises an electrical system, a lighting system, a heating, venting, and cooling (HVAC) system, a security system, or an industrial automation system.

11. The method of claim 1, wherein said first set of wireless signals utilizes a protocol selected from the group consisting of:

Bluetooth™, Bluetooth™ Low Energy, ANT, ANT+, WiFi, Zigbee, Thread, and Z-Wave.

12. The method of claim 1, wherein said first set of wireless signals have a carrier frequency in the range of 850 MHz and 17.5 GHz inclusive.

13. The method of claim 1 wherein said first transceiver and said second transceiver are configured to calculate their relative positions within said detection area automatically.

14. The method of claim 1 wherein said first transceiver and said second transceiver are configured to define automatically a detection area including said first transceiver and said second transceiver.

15. The method of claim 1 wherein said first object is a human being.

16. The method of claim 15 wherein said new object is a human being.

17. The method of claim 16 wherein said first object and said new object are the same human being.

18. The method of claim 1 wherein said new object is a human being.

19. A method for determining the presence of a target object within a detection area, the method comprising:

providing a first transceiver disposed at a first location within a detection area;

providing a second transceiver disposed at a second location within said detection area;

a computer server communicably coupled to said first transceiver;

said first transceiver receiving a first set of wireless signals from said second transceiver when a calibration object is present within said detection area;

said computer server receiving a first set of signal data from said first transceiver, said first set of signal data comprising data about properties of said first set of wireless signals;

said computer server creating a first baseline signal profile for wireless communications from said second transceiver to said first transceiver, said first baseline signal profile being based at least in part on said properties of said first set of wireless signals in said first set of signal data when said calibration object is present in said detection area;

said first transceiver receiving a first new set of wireless signals from said second transceiver when a new object with a fiducial element is present in said detection area;

said computer server receiving a first new set of signal data from said first transceiver, said first new set of signal data comprising data about properties of said first new set of wireless signals;

said first transceiver receiving a second new set of wireless signals from said second transceiver when said object without a fiducial element is present in said detection area;

said computer server receiving a second new set of signal data from said first transceiver, said second new set of signal data comprising data about properties of said second new set of wireless signals;

said computer server rejecting said new object as said target object due to said computer server detecting said fiducial element, said rejection occurring regardless of comparison of said first new set of signal data to said baseline signal profile; and said computer server determining said target object is within said detection area by comparing said second new set of signal data to said baseline signal profile.

20. The method of claim 19, wherein said target object comprises a human and said new object comprises a non-human biological mass.

\* \* \* \* \*